(12) United States Patent
Palenchar et al.

(10) Patent No.: US 6,637,531 B2
(45) Date of Patent: Oct. 28, 2003

(54) VEHICLE HOOD SUPPORT AND LATCH SYSTEM

(75) Inventors: Thomas J. Palenchar, Greensboro, NC (US); Jan-Olof Bodin, Alings-s (SE); Dennis E. Stosel, Kernersville, NC (US); Eric R. Von Hoene, Greensboro, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 10/123,775

(22) Filed: Apr. 16, 2002

(65) Prior Publication Data

US 2002/0166707 A1 Nov. 14, 2002

Related U.S. Application Data

(63) Continuation of application No. 08/699,898, filed on Aug. 15, 1996, now Pat. No. 6,394,211.

(51) Int. Cl.⁷ .............................................. B62D 25/12
(52) U.S. Cl. .................................. 180/69.21; 180/89.17
(58) Field of Search ........................... 180/69.21, 69.23, 180/89.14, 89.15, 89.16, 89.17, 89.18, 89.19, 89.13; 280/684; 296/35.1, 76, 181, 183, 187

(56) References Cited

U.S. PATENT DOCUMENTS

| | | | |
|---|---|---|---|
| 2,723,552 A | 11/1955 | Dlugatch | |
| 2,729,487 A | 1/1956 | Krause et al. | |
| 2,756,085 A | 7/1956 | Hochstadt | |
| 2,773,715 A | 12/1956 | Lindner | |
| 2,776,160 A | 1/1957 | Krause | |
| 2,795,450 A | 6/1957 | Claud-Mantle | |
| 2,796,274 A | 6/1957 | Sigel | |
| 2,815,822 A | 12/1957 | Ramsey | |
| 2,852,293 A | 9/1958 | Claud-Mantle | |
| 2,967,324 A | 1/1961 | Gagnier | |
| 3,216,760 A | 11/1965 | Buchwald | |
| 3,232,368 A | 2/1966 | Sullivan | |
| 3,266,590 A | 8/1966 | Hungerford | |
| 3,556,240 A | * 1/1971 | Hartman et al. | ......... 180/69.21 |
| 3,628,622 A | * 12/1971 | Kiwitz | ..................... 180/69.21 |
| 3,674,162 A | 7/1972 | Smith | ..................... 214/138 R |
| 3,722,908 A | 3/1973 | Whitley, Jr. | |
| 3,730,575 A | 5/1973 | Arlauskas et al. | |
| 3,819,225 A | 6/1974 | Carlisle et al. | |
| 4,061,393 A | 12/1977 | Blomstrom | |
| 4,203,499 A | 5/1980 | Mlyata | |

(List continued on next page.)

FOREIGN PATENT DOCUMENTS

DE 3117791 3/1982

Primary Examiner—Brian L. Johnson
Assistant Examiner—Bridget Avery
(74) Attorney, Agent, or Firm—Watt Hoffmann, Co., LPA (57) ABSTRACT

A hood and fender assembly mounting and latch system for use with an over-the-highway tractor having a frame supporting an engine, a cab and a hood and fender assembly. A hinge pivotally connects the hood and fender assembly to the frame. A hex-shaped torsion bar and damper are used to assist in the opening and closing of the hood and fender assembly. The latch system includes a receiver assembly attached to the frame. A pin assembly is attached to the hood and fender assembly at a distal location relative to the hinge. The receiver assembly receives the pin assembly when the hood and fender assembly is in a position enclosing the engine and locates and maintains the hood and fender assembly in a predetermined position relative to the frame, independent of the cab. The receiver assembly has a lock lever which is movable between a latched position at which it engages the pin assembly and an unlatched position. A movable handle is located within the cab. A cable connects the handle with the lock lever to move the lock lever from the latched position to the unlatched position in response to movement of the handle.

18 Claims, 7 Drawing Sheets

U.S. PATENT DOCUMENTS

| | | | |
|---|---|---|---|
| 4,270,623 A | | 6/1981 | Brandl et al. |
| 4,281,733 A | | 8/1981 | Miller et al. |
| 4,287,787 A | * | 9/1981 | Kulhanek .................... 74/493 |
| 4,291,895 A | | 9/1981 | Wohrle et al. |
| 4,371,048 A | | 2/1983 | Hansen |
| 4,382,482 A | | 5/1983 | Brandl et al. |
| 4,482,023 A | | 11/1984 | Dziedzic et al. |
| 4,505,396 A | | 3/1985 | Hedlund et al. ............ 212/223 |
| 4,509,612 A | | 4/1985 | Stuart |
| 4,566,552 A | | 1/1986 | Hoffman et al. |
| 4,572,312 A | | 2/1986 | France et al. |
| 4,609,063 A | | 9/1986 | Heerdink et al. |
| 4,638,878 A | | 1/1987 | Komp .................... 180/89.13 |
| 4,658,470 A | | 4/1987 | Oen |
| 4,674,769 A | | 6/1987 | Ota et al. |
| 4,756,562 A | | 7/1988 | Foster et al. |
| 4,839,941 A | | 6/1989 | Orlando |
| 4,889,203 A | | 12/1989 | Hagarty |
| 4,893,958 A | * | 1/1990 | Wieland ........................ 403/7 |
| 4,915,441 A | | 4/1990 | Nitaka |
| 4,972,913 A | | 11/1990 | Ray et al. |
| 4,991,675 A | | 2/1991 | Tosconi et al. |
| 5,101,921 A | | 4/1992 | West et al. |
| 5,136,752 A | | 8/1992 | Bening et al. |
| 5,172,945 A | | 12/1992 | Doherty et al. |
| 5,176,417 A | | 1/1993 | Bauer |
| 5,217,262 A | | 6/1993 | Kurosaki |
| 5,730,239 A | | 3/1998 | Holter |
| 5,730,240 A | | 3/1998 | Hoffman et al. |
| 5,803,198 A | * | 9/1998 | Baxter et al. ............ 180/69.21 |
| 5,826,672 A | | 10/1998 | Holter et al. |
| 5,890,556 A | * | 4/1999 | Shearn et al. ............ 180/69.21 |
| 5,975,228 A | * | 11/1999 | Parfitt .................... 180/69.21 |
| 6,394,211 B1 | * | 5/2002 | Palenchar et al. ....... 180/69.21 |
| 6,454,035 B1 | * | 9/2002 | Waskow et al. ......... 180/89.17 |

* cited by examiner

VEHICLE HOOD SUPPORT AND LATCH SYSTEM

This is a continuation of Ser. No. 08/699,898, filed Aug. 15, 1996, now U.S. Pat. No. 6,394,211.

TECHNICAL FIELD

The present invention relates generally to releasably connecting a vehicle enclosure to a frame of the vehicle. In particular, the present invention relates to a hood and fender assembly mounting system for connecting a forwardly tiltable hood and fender assembly of a heavy duty truck to a frame of the vehicle and assisting in the opening and closing of the hood and fender assembly.

BACKGROUND ART

Conventional heavy duty trucks typically have a hood and fender assembly and a cab which are both supported by a frame of the truck. The hood and fender assembly is often made from a fiberglass reinforced composite material and is hinged to the frame at a forward end of the assembly. The cab is typically a metal weldment or riveted assembly mounted on the frame. The hood and fender assembly may be pivotably mounted and biased by a counter balancing spring which biases the hood and fender assembly toward either the open or closed position thereby easing operation of the hood and fender assembly when access to the engine is needed. The hood and fender assembly may also include a spring or damper device which controls the rate of travel of the hood and fender assembly in one or both directions, preventing sudden movement during operation of the hood and fender assembly. When the hood and fender assembly is in a closed position, the rearward end of the hood and fender assembly is generally mounted on and fastened to the cab.

Typically, spring loaded latches or elastic straps releasably connect a closed hood and fender assembly to, and in engagement with, the cab. The latch or strap is typically accessible only from outside of the vehicle. This generally requires a vehicle driver or mechanic to be outside the vehicle and access a first latch on one side of the hood and fender and then move to the other side of the vehicle and access a second latch on the other side of the vehicle.

This known latch or strap arrangement has disadvantages. One disadvantage is the amount of movement around both sides of the exterior of the truck on the part of the driver or mechanic to release or connect the latches. Another disadvantage is a lack of security. Any unauthorized person may access the engine and engine compartment merely by releasing the latches and pivoting the hood and fender assembly.

Frequently the mounting of the cab of an over-the-highway vehicle on a frame includes a shock absorbing mechanism. The shock absorbing mechanism allows a limited amount of movement of the cab relative to the frame while absorbing vibration and road shocks to improve ride qualities for an operator and any passengers. As the vehicle is operated, the respective movements of the hood and fender assembly and the cab relative to the frame and any torsional twisting of the frame which may occur during use cause considerable relative movement between the hood and fender assembly and the cab. This interaction between the hood and fender assembly reduces the ride quality by limiting the motion of the cab on its shock absorber and causing additional forces on the cab which degrade ride quality. Since the hood and fender assembly and the cab are typically relatively tightly engaged, relative movement causes undesirable forces to act between the hood and fender assembly and the cab. A large gasket between the hood and fender assembly and the cab may be needed to cushion these forces. Since the hood and fender assembly is typically a composite material while a cab is metal, these forces may disfigure the hood and fender assembly creating an undesirable and unsightly condition.

Typical counter balancing springs may be torsion bars which have a circular cross section. While a circular configuration allows for adjustment of the amount of bias on the hood and fender assembly, it may also require the use of additional fixing methods or connecting devices to secure the ends of the torsion bar.

DISCLOSURE OF THE INVENTION

The present invention provides a new and improved body panel support and latch system which is especially adapted for over-the-highway heavy duty type tractor vehicles. The invention includes a frame structure which includes a portion that supports an operator cab and a portion for mounting a prime mover or engine, forward of the cab. A body panel which, in the illustrated embodiment, comprises a hood and fender assembly is movable between opened and closed positions and is operative to enclose an engine compartment when in the closed position. At least one hood latch mechanism maintains closure of the hood and fender assembly and includes first and second latching assemblies.

The first latching assembly is attached directly to the frame preferably by a strut which is attached to and extends laterally from the frame structure and the second latching assembly is attached to a rear section of the hood and fender assembly. The first and second latching assemblies are engagable when the hood and fender assembly is moved to its closed position.

In the preferred and illustrated embodiment, at least one pivot assembly is mounted to a forward end of the frame structure and mounts a forward end of the hood and fender assembly for pivotal movement. With the disclosed mounting system, the hood and fender assembly is entirely supported by the frame structure, independent of the operator cab.

In the more preferred embodiment, the forward end of the hood and fender assembly is pivotally attached to the frame by two hinge assemblies. Each hinge assembly preferably includes a J-bracket, a portion of which is bolted to the hood assembly. A spring assist provided by at least one torsion bar aids in the opening and closing of the hood and fender assembly.

In the exemplary embodiment, two torsion bars are provided, each having a hex-shaped cross-section. Each J-bracket includes a hex-shaped socket adapted to receive one end of a torsion bar. The socket is located on the pivot axis of the hinge assembly so that as the hood and fender assembly opens or closes the end of the torsion bar received in the socket is rotated. The socket is enclosed in a rubber ring isolator to cushion the frontward portion of the hood and fender assembly from the frame. The opposite end of the torsion bar is received in a stationary hex-shaped opening where it is held against rotation. Thus, as the hood and fender assembly is closed, each torsion bar is twisted thus, generating a preload which aids in opening and closing of the hood and fender assembly. The hex-shaped torsion bar allows for adjustment while easing assembly by eliminating the need for additional connecting devices or fixing methods which may be necessary with torsion bars of circular cross section. The present invention further provides alignment structure which allows for adjustment of the preload of the torsion bars prior to the installation of the hood and fender assembly to the frame.

According to a feature of the invention, at least one motion control device is provided which controls the rate of travel of the hood and fender assembly as it moves between the opened and closed positions. In the preferred and illustrated embodiment, the motion control device comprises a fluid filled, extendable cylinder one end of which is attached to the hood and fender assembly, the other end of which is coupled to the frame structure. The combination of the torsion bar and a damper control regulates the effort required to move the hood and fender assembly and also limits the rate of- travel of the hood and fender assembly, providing for predictable-operation of the hood and fender assembly.

The latch system automatically connects itself upon pivotal movement of a hood and fender assembly to a fully closed position to interconnect the hood and fender assembly to the frame. The latch system includes a handle located within a cab of a truck which is actuatable to release the connection. Thus, the driver or mechanic does not have to be located outside the cab and move to both sides of the truck to release or connect the latch system. If doors of the cab are locked with the latch system connected, unauthorized access to the engine compartment is inhibited. Since the hood and fender assembly is releasably connected to the frame rather than the cab, forces caused by relative assembly and cab movements can be and are reduced and resultant disfiguring damage to the hood and fender assembly and degradation of ride quality are avoided.

The apparatus includes a first latching assembly attached to the frame. A coacting latching assembly is attached to the hood and fender assembly at a distal location relative to the hinge. The latching assemblies are releasably interconnected when the hood and fender assembly is in a position which encloses the engine to locate and to maintain the hood and fender assembly in a predetermined position relative to the frame independent of the cab. The releasable latching assembly has a lock lever which is movable between a latched position engaging the coacting latching assembly and an unlatched position for disengagement from the coacting latching assembly. A movable handle is located within the cab. A cable connects the handle with the lock lever to move the lock lever from the latched position to the unlatched position in response to movement of the handle.

The coacting latching assembly includes a shaft attached at a mounting end portion to the hood and fender assembly. A guide member is movable along the shaft. A bias mechanism urges the guide member away from the mounting end and toward an outer end of the shaft. The releasable latching assembly includes a cup shaped receiver having an opening extending therethrough. A surface on the guide member engages the cup shaped receiver when the hood and fender assembly pivots to a substantially closed position to move the guide member towards the mounting end of the shaft against a force of the bias mechanism. The outer end of the shaft is exposed during movement of the hood and fender assembly from the partially closed position to a fully closed position and extends through the opening in the receiver. The lock lever engages the shaft near an end portion from the opening to prevent movement of the hood and fender assembly towards an open position. The lock lever includes a slot which acts on a rivet to limit travel of the lock lever to an acceptable range.

The coacting latching assembly includes a shoulder near the outer end of the shaft to engage a portion of the lock lever and maintain the receiver and the guide member engaged with the latching assembly in the fully closed position. Surfaces of the cup-shaped receiver on the guide member are frusto-conical to guidingly align the latching assembly during latching movement. The outer end of the shaft cams the lock lever in a direction transversely away from the shaft as it is moved to a position extending from the opening in the receiver.

Accordingly, an object of the invention is to provide a heavy duty over-the-highway vehicle with a novel and improved hood and fender assembly mounting system.

Further features of the present invention will become apparent to those skilled in the art to which the present invention relates from reading the following specification with reference to the accompanying drawings.

DESCRIPTION OF A PREFERRED EMBODIMENT OF THE INVENTION

Figure 1:
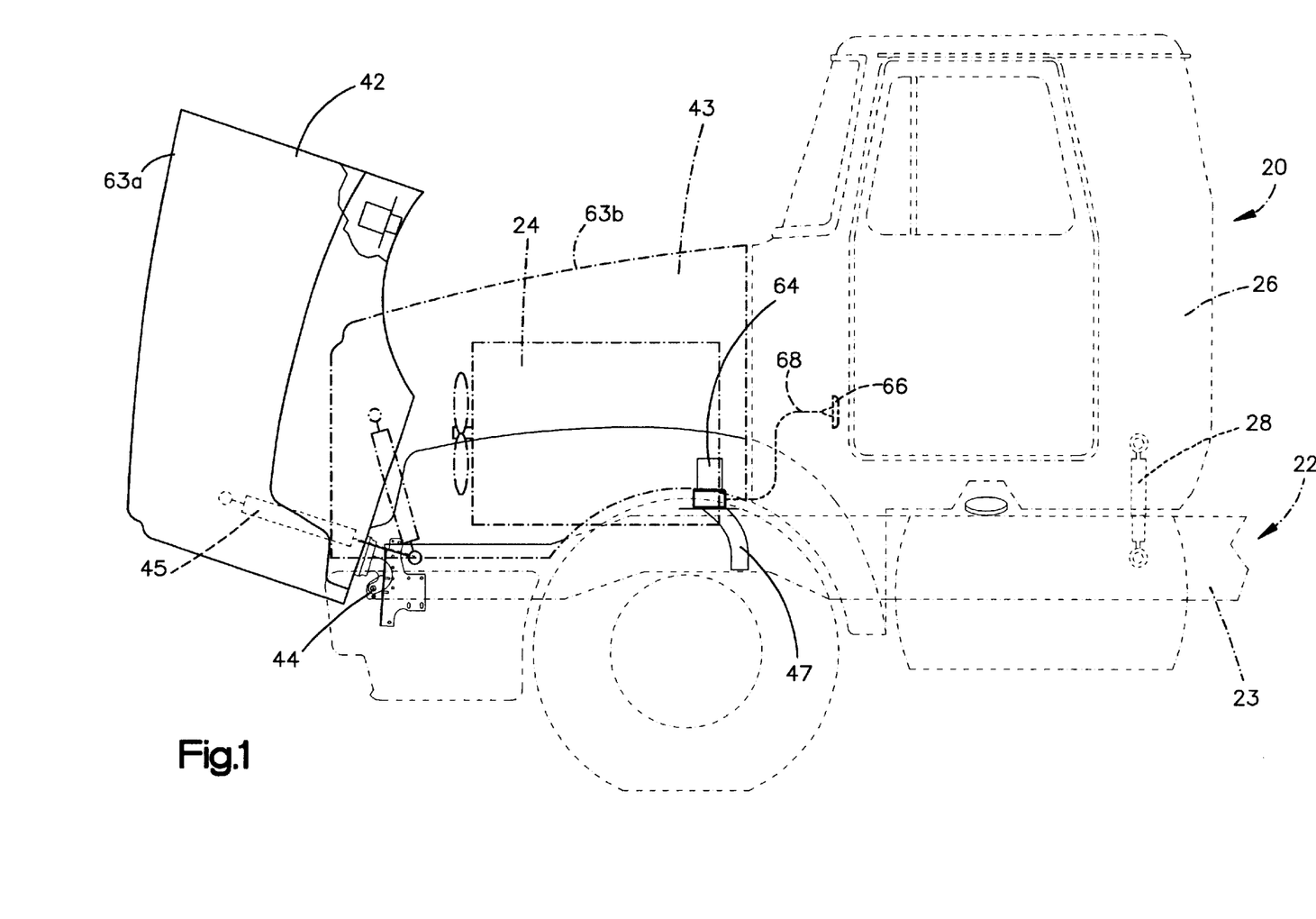
FIG. 1 is a side elevational view of a heavy duty truck having a forwardly tiltable hood and fender assembly illustrated in different positions.

A conventional over-the-highway heavy duty vehicle in the form of a tractor 20 having a hood and fender assembly mounting system embodying the present invention is illustrated in FIG. 1. The tractor 20 includes a frame 22 which supports drive train components including an engine 24. The frame 22 includes a spaced pair of longitudinally extending rails 23 extending continuously for substantially the entire length of the tractor 20. A cab 26 is mounted on the frame 22 and defines a compartment for a vehicle driver to occupy during operation of the tractor 20. A shock absorbing mechanism 28 may be connected between the cab 26 and frame 22 to suspend and control movement of the cab relative to the frame.

The tractor 20 also includes a hood and fender assembly 42. The hood and fender assembly 42 is preferably made as a one-piece, molded fiberglass reinforced composite body component. The forward end of the hood and fender assembly 42 is connected to the frame 22 by a pair of hinge assemblies 44 located at a forward end portion of each frame rail 23. The hinge 44 pivotally connects a forward end of the hood and fender assembly 42 to the frame 22 so it is forwardly tiltable to an open position (shown by solid lines 63a, FIG. 1), permitting access to components in the engine compartment 43 including the engine 24.

Figure 2:
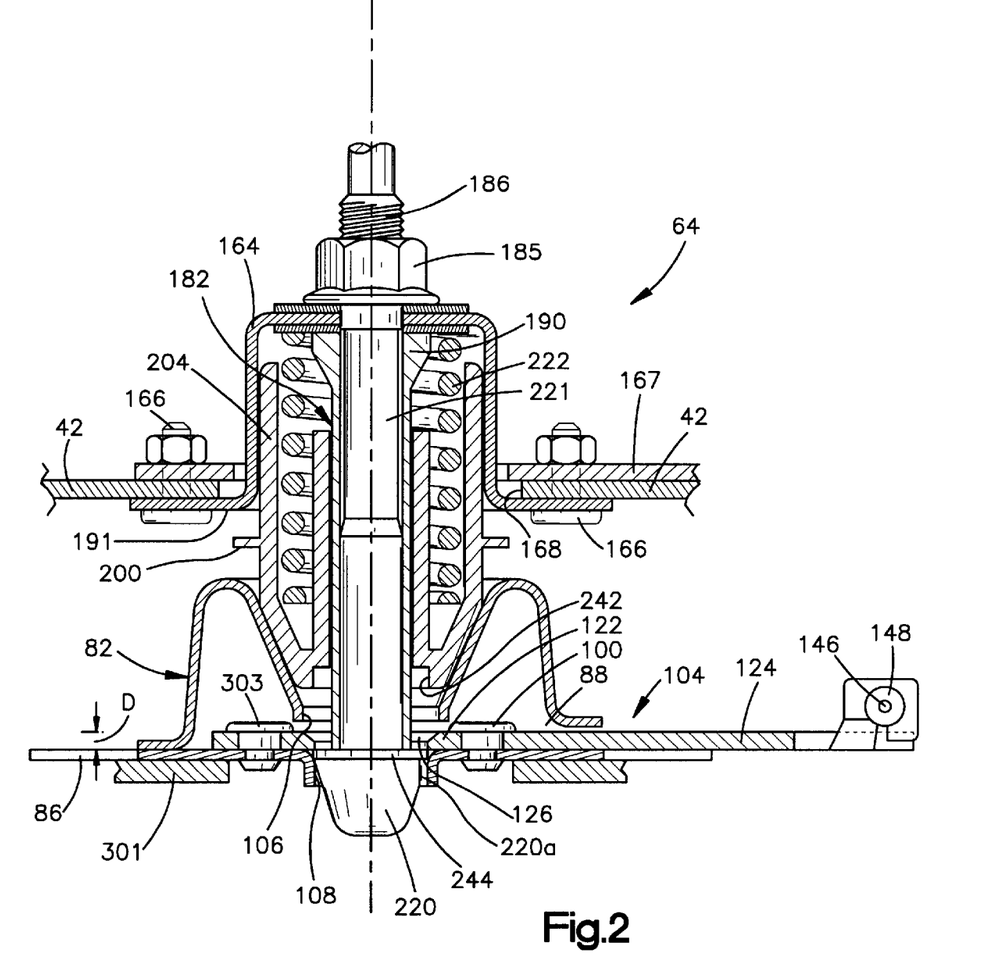
FIG. 2 is a longitudinal cross-sectional view of a latch mechanism for connecting the hood and fender assembly to the truck frame, illustrated in a latched position.

In addition to pivotally connecting the forward end of the hood and fender assembly 42 to the frame 22, a hood and fender assembly mounting system, embodying the present invention, releasably connects the rearward portion of the hood and fender assembly 42 directly to the frame rails 23 via hood latch mechanisms 64 and receiver support struts 47, thereby isolating the hood and fender assembly 42 from the cab 26. Each hood latch mechanism 64 connects a rearward side portion of the hood and fender assembly 42 to a respective receiver support strut 47 when the latch mechanism 64 is in the latched position, as illustrated in FIG. 2. The hood latch mechanism 64 maintains the hood and fender assembly 42 in the closed position, as illustrated by dashed lines 63b in FIG. 1. Each latch mechanism 64 automatically adopts the latched position upon pivotal movement of the hood and fender assembly 42 to the fully closed position 63b relative to frame 22. The hood and fender assembly mounting system includes a handle 66 located within the cab 26 (FIG. 1), and cables 68 (FIGS. 1 and 4) connecting each latch mechanism 64 with the handle 66. The hood and fender assembly mounting system further provides hood restraint cylinders 45 (FIG. 1) and torsional spring assist 300 with a hex-shaped cross section (FIG. 7) which regulate the rate of travel and amount of force required to open and close the hood and fender assembly 42.

Figure 5:
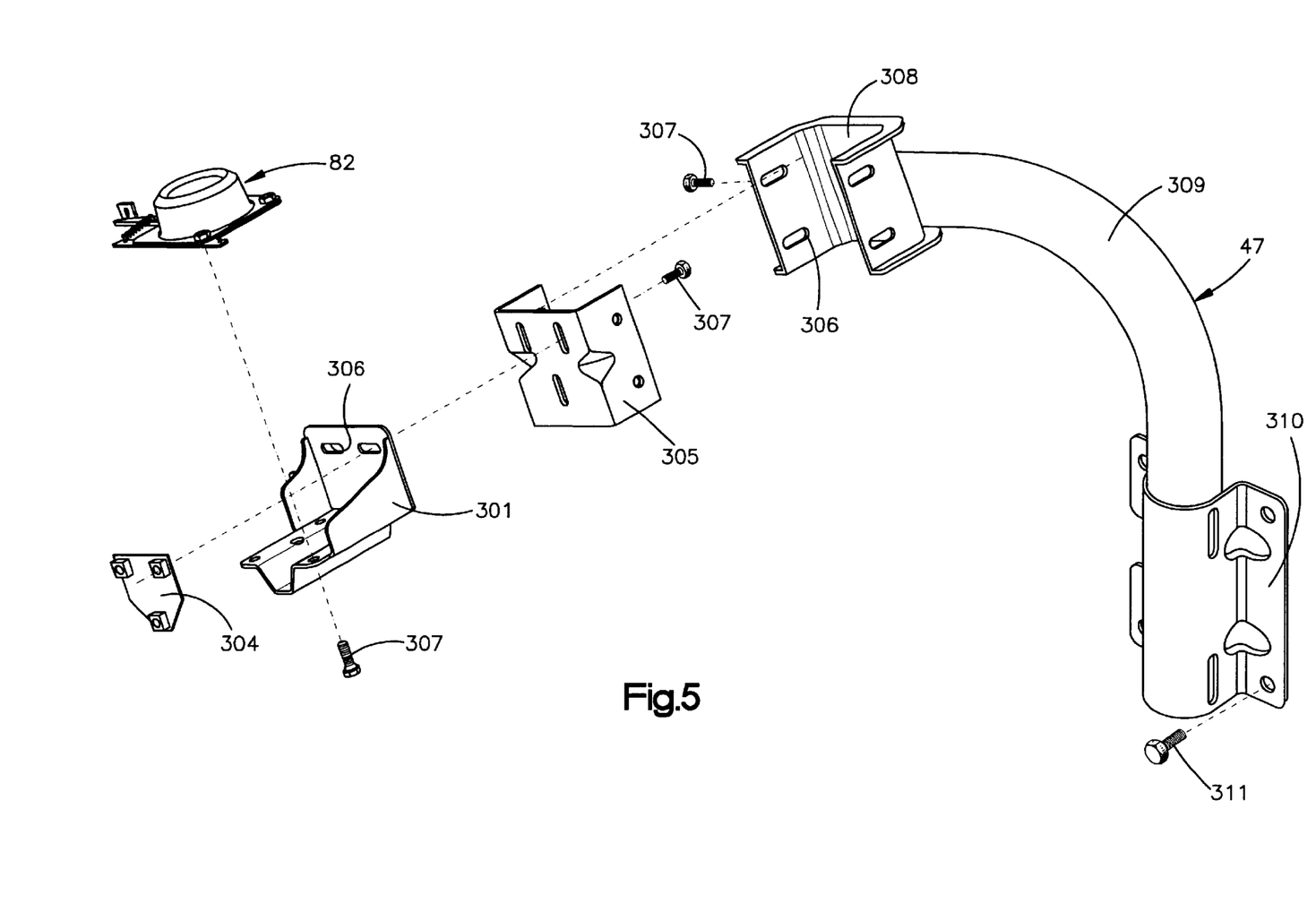
FIG. 5 is an exploded view of the receiver support strut used to mount the latch mechanism illustrated in FIGS. 2, 3, and 4 to the truck frame.

A hood and fender assembly mounting system, embodying the present invention, includes a pair of substantially identical latch mechanisms 64, each comprising a pin assembly.162 and a receiver assembly 82 (FIG. 3) mounted on respective receiver support struts 47 which in turn are each attached to a respective frame rail 23 (FIG. 1). While only one hood latch mechanism 64 is shown in FIGS. 1 and 5, it will be apparent that a pair of hood latch mechanism 64 is usually required in the hood and fender mounting system to attach the sides of the hood and fender assembly 42 with a respective frame rail 23. FIG. 5 illustrates mounting of the receiver assembly 82 to the receiver support strut 47. A plurality of bolts 311 extend through the frame mounting bracket 310 and the frame rail 23 to attach the receiver support strut 47 to the rail (FIG. 5). A receiver mounting bracket 308, which has adjustment slots 306 is connected to a second intermediate hood support bracket 305 by a plurality of screws 307. A plurality of screws 307 extend through a retaining plate 304, a first intermediate hood support bracket 301 and the second intermediate bracket 305 to form the mounting location for the receiver assembly 82. Both the first and second intermediate brackets, 301 and 305 respectively, incorporate slots 306 for adjustment purposes. The receiver assembly 82 is secured to the first intermediate hood support bracket with four screws 307. The receiver assemblies 82 of the latch mechanisms 64 are thereby anchored directly to the frame rail 23 via the receiver support strut 47. When the pin assembly 162 is engaged in the receiver assembly 82 as illustrated in FIG. 2, the engaged latch mechanism 64 serves as the rear support for the hood and fender assembly 42 and isolates the hood and fender assembly 42 from stresses caused by movement of the cab 26 relative to the frame, thus reducing damage to the hood.

Figure 3:
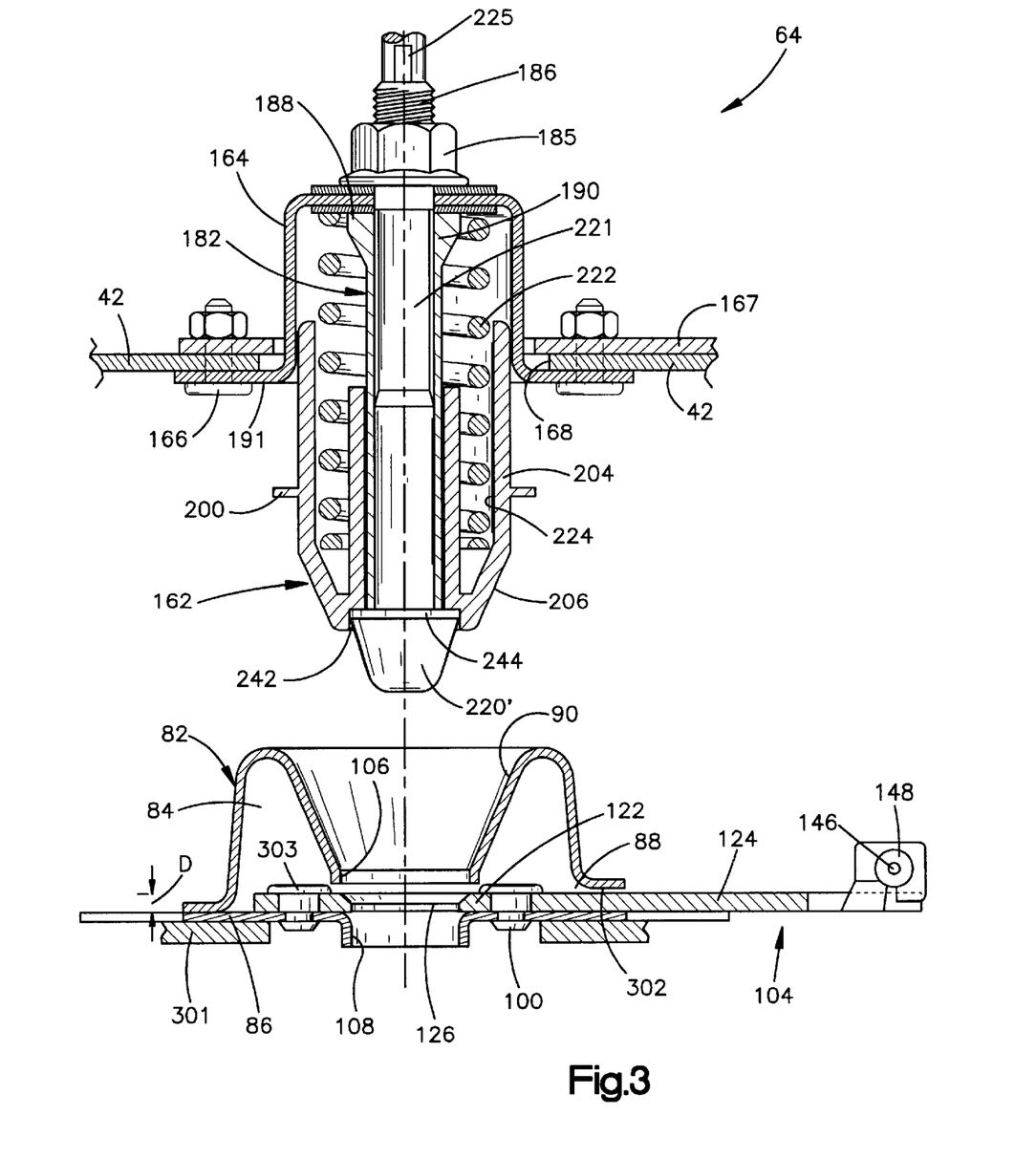
FIG. 3 is a longitudinal cross-sectional view of the latch mechanism of FIG. 2, illustrated in an unlatched position.

Each latch mechanism 64 is actuated using a cable assembly 68 to release the connection between the hood and fender assembly 42 and the frame 22 when the latch transitions from a latched position (FIG. 2) to an unlatched position as illustrated in FIG. 3. As with the receiver support struts 47, only one latch mechanism 64 is illustrated in FIG. 1 but it will be apparent that a pair of latch mechanisms 64 is usually required to attach a side of the hood and fender assembly 42 with a respective frame rail 23.

The latch mechanism 64 includes the receiver assembly 82 which connects directly to the first intermediate hood support bracket 301 and a pin assembly 162 (FIG. 2). The receiver assembly 82 includes a cup-shaped receiver 84 and a plate 86 (FIG. 3). The cup-shaped receiver 84 includes a frusto-conical surface 90. The cup shaped receiver 84 is formed to include a clearance section 88 defined by dashed lines in FIG. 4 which does not contact the plate 86, so that essentially only three sides of the four corners of the receiver 84 contact the plate 86. The clearance section 88 spaces the bottom edge of the receiver 302 away from the plate 86 a predetermined distance D, which is slightly greater than the thickness of a lock lever 104, to allow clearance for the lock lever. A pair of rivet fasteners 100 and 303 connect the lock lever 104 to the plate 86 in such a way as to allow pivotal movement of the lock lever and the receiver 84 is then spot welded to the plate 86 prior to the attachment of the receiver assembly 82 to the first intermediate hood support bracket 301. A plurality of screws 307 extend through the receiver 84 and the plate 86 to attach the receiver assembly 82 to the first intermediate hood support bracket 301 (FIG. 5).

Figure 4:
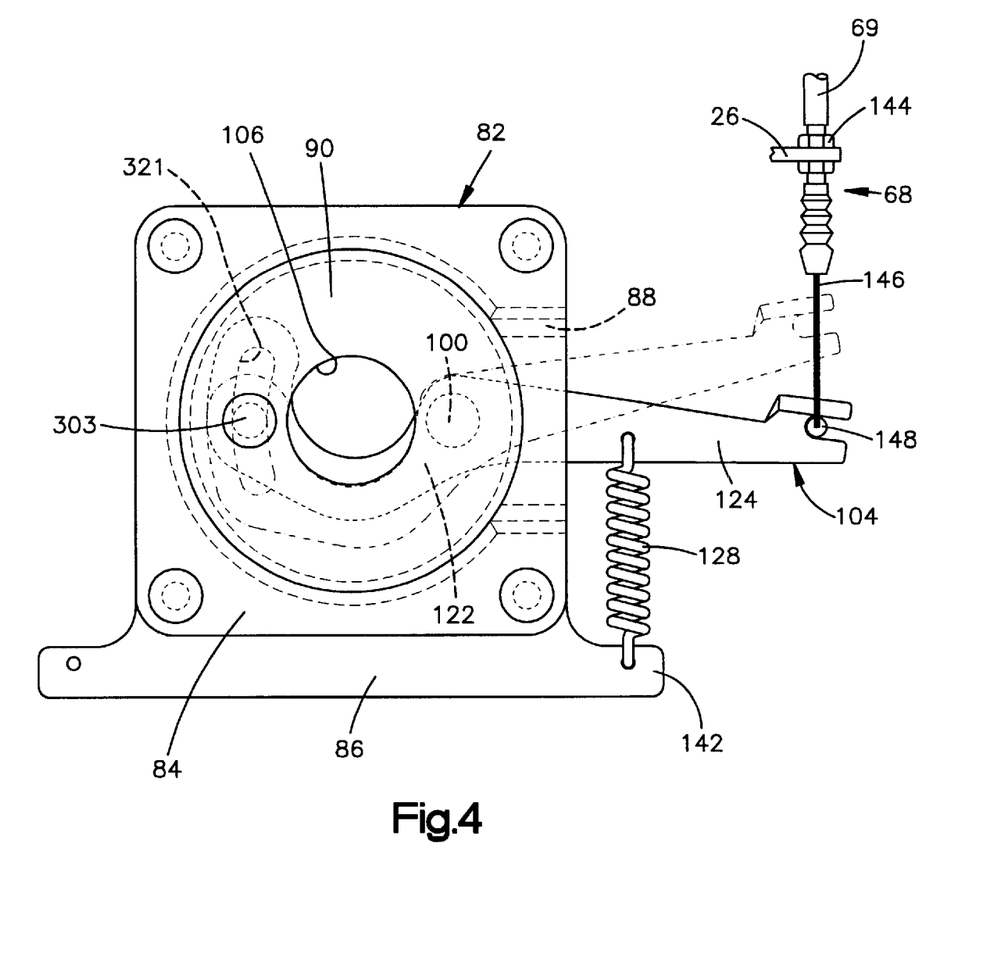
FIG. 4 is a plan view of a portion of the latch mechanism illustrated in FIG. 3, the receiver assembly, as seen from above the receiver.

The lock lever 104 is located between the receiver 84 and the plate 86 as illustrated by FIG. 4. The lock lever 104 is preferably formed from a stamped metal, such as steel and has a thickness slightly less than the distance D (FIG. 3) which the receiver 84 and plate 86 are spaced apart in the clearance section 88. Thus, the lock lever 104 can move between the receiver 84 and plate 86 within the clearance section 88. The rivet fastener 100 extends through the lock lever 104 to pivotally mount the lock lever relative to and between the receiver 84 and the plate 86. The rivet fastener 303 extends through a slot 321 on the lock lever 104 and acts as a stop which limits the travel of the lock lever about its pivot point, rivet 100. The lock lever 104, thus, comprises a member which is pivotable relative to the receiver 84 and plate 86. An opening 106 extends through the receiver 84 and an opening 108 (shown in FIG. 3) extends coaxially through the plate 86. The opening 106 is larger than the opening 108 to promote alignment when the pin assembly 162 is moving into a latched position. The opening 108 has a diameter only slightly larger than the shoulder 244.

The lock lever 104 includes a pin engaging portion 122 which is located completely between the receiver 84 and the plate 86 in the clearance section 88. The lock lever 104 also includes an arm portion 124 integrally formed as one piece with the pin engaging portion 122. The pin engaging portion 122 is for engaging the underside of the shoulder 244 of the pin assembly 162. The arm portion 124 is located outside of the receiver 84 and plate 86 and is operated to move the pin engaging portion 122 out of engagement with the other member of the latch mechanism 64. The arm portion 124 is connected with the cable 68 for moving the lock lever 104 between the latched position, as illustrated in FIG. 2 and solid lines in FIG. 4, and the unlatched position, as illustrated in FIG. 3 and dashed lines in FIG. 4.

In the latched position, the pin engaging portion 122 engages a part of the pin assembly 162. In the unlatched position, the pin engaging portion 122 is disengaged from the pin assembly 162. The pin engaging portion 122 includes a tapered surface 126 for ease of engaging the pin assembly 162 (FIG. 3). The lock lever 104 includes a spring 128 extending between the arm portion 124 and an extension 142 of the plate 86 (FIG. 4). The spring 128 biases the lock lever 104 toward the latched position in engagement with the other member of the latch mechanism 64.

The cable 68 which may be a Bowden type cable (FIGS. 1 and 4) and includes a sheath 69 and a lock nut 144 (shown only in FIG. 4) which is fixed relative to the first intermediate hood support bracket 301 and the cab 26. The cable 68 extends at one end from the lock lever 104 in the engine compartment to the other end inside the cab 26. Located coaxially and movable relative to the sheath 69 is a wire portion 146, which is connected at one end to the arm portion 124 by a crimped ball 148 or other suitable cable end attachment. The other end of the wire 146 is connected to a handle 66. The handle 66 (FIG. 1) is operably mounted in a support member fixed to the cab 26. The handle 66 can move pivotally or axially relative to its support. Movement of the handle 66 causes the arm portion 124 of the lock lever 104 to pivot, as illustrated in FIG. 4, by tension in the wire 146.

The handle 66 being located within the cab 26 of the tractor 20 enables an operator of the tractor to release the hood and fender assembly 42 from within the cab for access to the engine compartment 43. The hood latch mechanisms 64, thus, provide a measure of security for the tractor 20, because when the doors to the tractor are locked, no one can easily gain access to the engine compartment 43. Also, the hood latch mechanism 64 of the present invention allows release of the hood and fender assembly 42 without having to walk around the exterior sides of the tractor 20 or be outside of the tractor in inclement weather.

The latch mechanism 64 includes the pin assembly 162 shown best in FIG. 3. The pin assembly 162 is attached to the hood and fender assembly 42 at a rearward location away from the hinge 44. The receiver assembly 82 receives the pin assembly 162 when the hood and fender assembly 42 encloses the engine compartment 43 (shown in FIG. 1, by the dashed lines 63b). The pin assembly 162 includes a mounting bracket 164 which is attached to the hood and fender assembly. Bolts 166 and weldnuts connect the mounting bracket 164 to the fiberglass hood and fender assembly 42 through a metal reinforcement 167 located on an inner surface of the hood and fender assembly 42 which delineates the engine compartment 43. This renders the latch mechanism 64 substantially inaccessible from the exterior of the tractor 20.

The mounting bracket 164 is essentially a cup-shaped member made from a drawn metal, such as steel or aluminum, which attaches to the hood and fender assembly 42 so the pin assembly 162 extends from an opening 168 in the inner surface of the hood and fender assembly 42. A pin or shaft 182 is connected to a bottom inner surface of the cup-shaped mounting bracket 164. The shaft 182 includes a sleeve 190 and a stud 221. A shoulder 188 is formed on one end of the sleeve 190. The stud 221 includes a threaded portion 186 at one end and a tapered surface 220 at the other end. The stud 221 is enclosed along its length by the sleeve 190, with the threaded portion 186 extending through the sleeve at the shoulder 188 of the sleeve. The threaded portion 186 is inserted into an opening in the mounting bracket 164 and a locking nut 185 is threaded onto the threaded portion 186 to draw the shoulder 188 of the sleeve 190 against the bottom inner surface of the mounting bracket 164. In the preferred embodiment, as illustrated in FIG. 3, the threaded portion 186 further includes a structure such as flattened sides 225 or a torx configuration to engage an assembly tool when tightening the nut 186. An alternative embodiment, shown in FIG. 2, the tapered end 220 includes a structure, such as flattened sides 220a, for engaging an assembly tool. Washers may be used under the nut 185 or above the shoulder 188 of the sleeve 190 to distribute the load on the mounting bracket 164. A shoulder 244 is present at the tapered end 220 which retains the end of the sleeve 190. Therefore the distance between the tapered end 220 and the mounting bracket 164 is determined by the length of sleeve 190 and the thickness of any washer present between the shoulder 188 of the sleeve 190 and the mounting bracket 164.

A guide member 204 has a frusto-conical lead surface 206 and is axially movable along the shaft 182 at the tapered end 220. The guide member's external frusto-conical surface 206 is shaped similarly to the internal frusto-conical surface 90 of the receiver 84. This provides for load distribution during movement of the pin assembly 162 into the receiver assembly 82 as the hood and fender assembly 42 pivots from an open position to a closed position and provides at least some self-alignment characteristics. At least the shaft 182 and the guide member 204 extend through the opening 168 in the hood and fender assembly 42.

A spring 222 is located coaxially relative to the shaft 182 and the guide member 204 within an annular recess 224 of the guide member. The spring 222 biases the guide member 204 towards the tapered end 220. The guide member 204 includes another recess 242 at a leading axial end of the guide member for engaging a second shoulder 244 formed on the shaft 182 at the tapered end 220. The shoulder 244 limits the amount of axial travel of the guide member 204 along the shaft 182 in a direction away from the mounting bracket 164.

As the hood and fender assembly 42 is moved from the open position, as illustrated by the solid lines 63a in FIG. 1, towards the closed position, as illustrated by dashed lines 63b, the tapered end 220 of the shaft 182 and the frusto-conical lead surface 206 of the guide member 204 enter the receiver 84 and may engage the frusto-conical surface 90. The shaft 182 and guide member 204, thus, are fully seated and aligned in the receiver 84 prior to any movement of the shaft 182 into the opening 106 thereby serving to self-align the pin assembly 162 relative to the receiver assembly 82, as well as positioning the hood and fender assembly 42 relative to the frame 22. This self-alignment is due to the interaction between the frusto-conical surfaces 90, 206 and tapered surface 220 of the respective latch members 82, 162. The interaction between the surfaces 206 and 90 also serves to distribute the loads on the mounting bracket 164 during movement to a latched position.

As the hood and fender 42 assembly move towards its closed position, the first engagement between the frusto-conical surfaces 90, 206 defines a partially closed position of the hood and fender assembly relative to the frame 22 and cab 26. The bias force of the spring 222 maintains the bracket 164 slightly spaced from the receiver 84. Upon further movement of the hood and fender assembly 42 relative to the frame 22, from the partially closed position to a fully closed position, the guide member 204 remains stationary in the receiver 84. However, as the bias force of the spring 222 is overcome, the tapered end 220 of the shaft 182 extends through the opening 106 in the receiver assembly 82 and engages the tapered surface 126 of the pin engaging portion 122 to cam open the lock lever 104.

The tapered end 220 of the shaft 182 is tapered in order to self center in the receiver 84 to offset minor misalignment due to deflection of the hood and fender assembly 42 during closing. As the tapered end 220 and a shoulder 244 of the shaft engage the tapered surface 126 they force the pin engaging portion 122 of the lock lever 104 to move to a position, in a direction normal to the shaft, allowing the second end portion of the shaft 182 to pass beyond the pin engaging portion. Upon sufficient axial movement of the tapered end 220 beyond the tapered surface 126, the spring 128 biases the pin engaging portion 122 towards the latched position, as illustrated in FIG. 4, in which the pin engaging portion 122 contacts the under side of the shoulder 244 thereby preventing movement of the pin assembly 162 out of the receiver assembly 82, but may not be in contact with the shaft 182. A concentric ridge 200 is formed on the guide member 204 which may engage the cup shaped mounting bracket 164 at the surface 191 to prevent over-travel of the guide member by stopping against the surface 191 in the event that the hood and fender assembly 42 is closed with excessive force. The amount of travel of the guide member 204 which is allowed prior to engaging the surface 191 serves to provide at least some isolation between the rearward portion of the hood and fender assembly 42 and the frame 22. Thus, when in the latched position, the shaft 182 is locked in place and prevented from axial movement outwardly of the receiver assembly 82 and plate opening 108, as illustrated in FIG. 2. This maintains the pin assembly 162 latched in the receiver assembly 82 which maintains the rearward portion of the hood and fender assembly 42 fixed relative to the frame 22.

This hood latch mechanism 64 positively and automatically locks the hood and fender assembly 42 in place relative to the frame 22 when the hood and fender assembly is moved from the partially closed position to the fully closed position against the bias force of the spring 222. No manual latching on either side of the tractor 20 is required. Any pivotal movement of the hood and fender assembly 42 towards the open position or laterally or longitudinally relative to the frame 22 is prevented. Due to its shock absorbing mechanism 28, the cab 26 will move relative to the frame 22, but the hood and fender assembly 42 is not free to move relative to the frame because it is fixed directly to the frame by the hinges 44 and hood latch mechanisms 64 (supported by the receiver support struts 47).

To release the latch mechanism 64, the handle 66 within the cab 26 is pulled to force the wire 146 to pivot the arm portion 124 of the lock lever 104. The pin engaging portion 122 pivots in a direction away from engagement with the tapered end 220 of the shaft 182, to the unlatched position, illustrated in FIG. 4 dashed lines. Excessive travel of the pin engaging portion 122 and overstretch of the spring 128 while moving away from engagement with the shaft 182 is prevented when the slot 321 in the lock lever 104 stops against the non-pivoting rivet 303. The biasing force of the spring 222 causes the hood and fender assembly 42 to pivot slightly from the fully closed position, as illustrated in FIG. 2, to a partially closed position in which the guide member 204 still engages in the receiver assembly 82 However, the shaft 182 is not engaged by the lock lever 104 to any degree which would prevent further pivotal movement of the hood and fender assembly 42 towards the fully opened position relative to the frame 22, as illustrated by solid lines 63*a* in FIG. 1.

The front of the hood and fender assembly 42 is attached to the frame 22 with two hinge assemblies 44, one per frame rail 23, FIG. 1. Only one hinge assembly 44 will be described herein and it will be obvious that a substantially similar hinge assembly is required at the other frame rail 23. The hinge assembly 44 includes a J bracket 320, a hood adjusting rod 316, and a hood pivot bracket 314, FIG. 6. A plurality of bolts 324 connect the J bracket 320 to the inside of the hood and fender assembly 42 through adjustment slots 325 on the J bracket 320. The threaded hood adjusting rod 316 which is located in the hood bracket 318 is used to position the hood and fender assembly 42 in the fore and aft directions by adjusting the jam nuts 317 on the threads of the hood adjusting rod 316 while the bolts 324 are loose in the adjusting slots 325 until the hood and fender assembly is in the correct position and then tightening the bolts 324 to secure the J bracket 320 to the hood and fender assembly. The hinge assembly 44 is attached to a toweye bracket 313 via the hood pivot mounting bracket 314 using two nuts 315. The toweye bracket 313 is attached to a frame rail 23.

Figure 6:
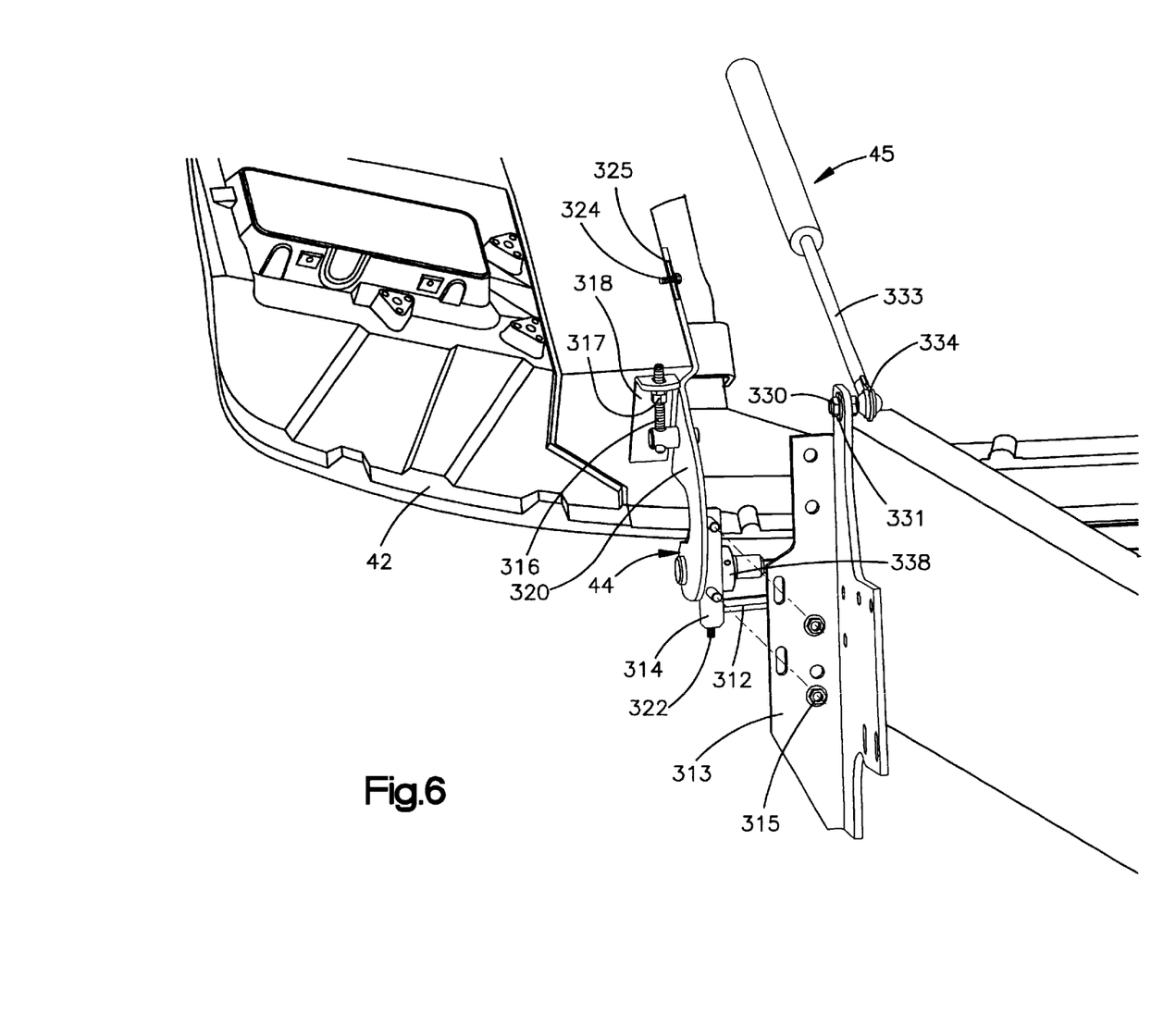
FIG. 6 is an exploded rear elevational view of a hinge connection between the hood and fender assembly and the truck frame with the hood and fender assembly open.
Figure 7:
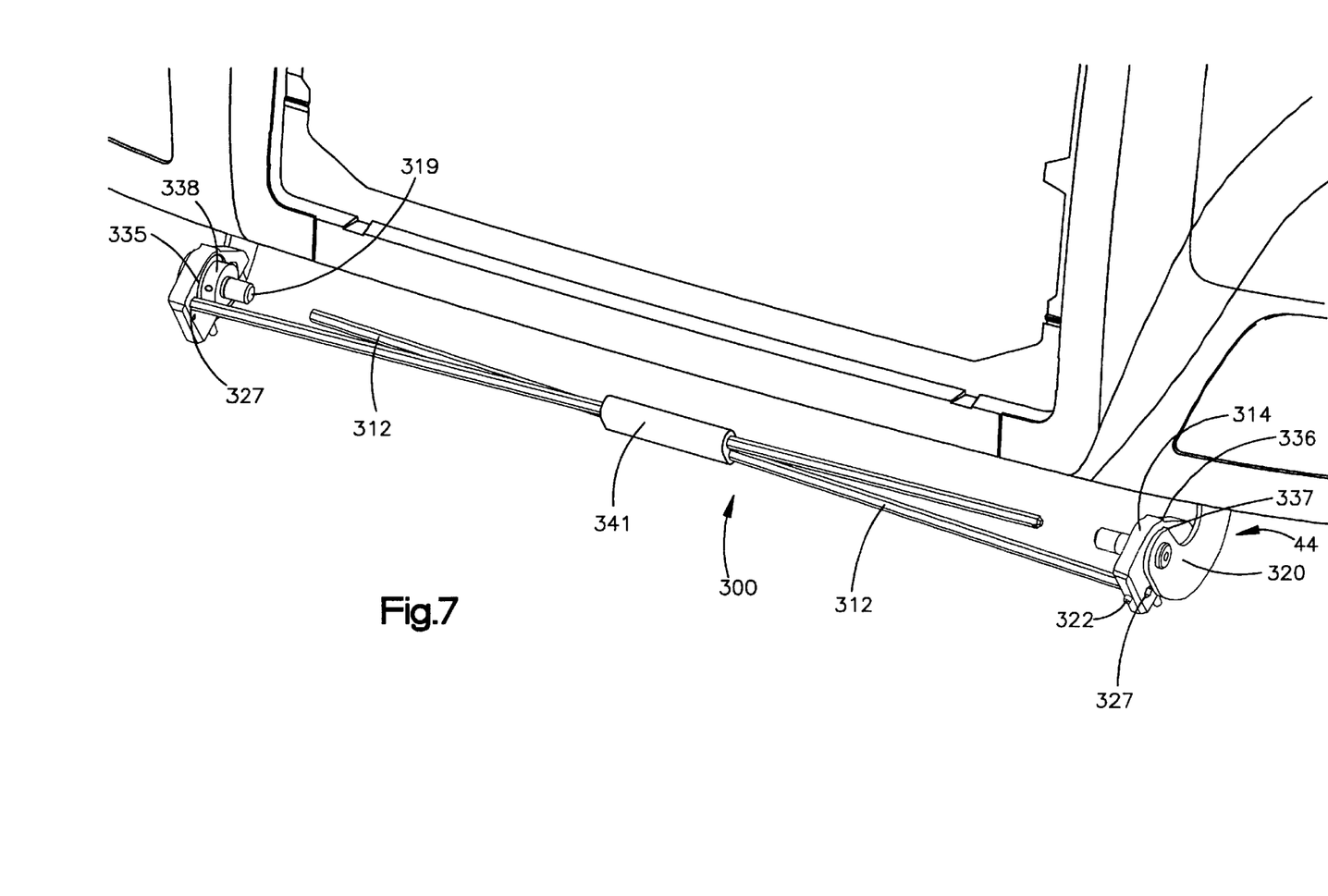
FIG. 7 is an exploded front elevational view of the torsion spring assist as attached to the hinge assembly shown in FIG. 6.

To regulate the effort required to open and close the hood and fender assembly 42, a torsion spring assist 300 including one or more hex-shaped torsion bars 312 is installed between the two hinge assemblies 44 (see FIG. 7). The J bracket 320 has a rigidly mounted socket 319 which accepts an end of a hex shaped torsion bar 312. The J bracket socket 319 protrudes through a circular opening in the hood pivot mounting bracket 314 and is able to rotate within the opening, allowing the forward end of the hood and fender assembly 42 to pivot about the center of the circular opening in the hood pivot mounting bracket 314 and the center of the J bracket socket. A rubber ring isolator 335 is located within the opening of the hood pivot mounting bracket 314 to provide some isolation between the J bracket 320 and the frame 22. A lock collar 338 is used to retain the relative position of the J bracket 320 and the hood pivot mounting bracket 314, and a thrust washer may be used between the lock collar 338 and the hood pivot mounting bracket 314 to reduce wear therebetween. A hex-shaped torsion bar 312 is pushed inboard through a hex shaped opening 327 in one hood pivot mounting bracket 314 and then is inserted into the J bracket socket 319 at the opposite hinge assembly 44. A set screw 322 (FIGS. 6 and 7) is then inserted through the bottom of the hood pivot bracket 314 to prevent the hex-shaped torsion bar 312 from sliding in an outboard direction, thereby maintaining the connection at both the J bracket socket 319 and the hood pivot bracket 314 (FIG. 6). Thus, the hex-shaped torsion bar 312 is prevented from rotation about its axis relative to the frame 22 at one end by the hex shaped opening 327 in the hood pivot bracket 314 and rotates about its axis at the other end when the hood and fender assembly 42 is pivoted between the open and closed position thereby rotating the J bracket socket 319 and twisting the hex-shaped torsion bar. A bushing 341 is installed at the midpoint of the hex-shaped torsion bars 312 to locate them and prevent any movement other than twisting during pivoting of the hood and fender assembly 42.

Because the hex shaped opening 327 in the hood pivot mounting bracket 314 and the interior dimensions of the J bracket socket 319 are a close slip-fit to the hex-shaped torsion bar 312, no other means of preventing rotation of the bar relative to the J bracket socket or hood pivot mounting bracket are necessary, eliminating the need for additional fasteners or fixing methods required by existing torsion bars with a circular cross section. Additionally, the hex shape of the torsion bar 312 allows for an adjustment to preload the torsion bars 312 to regulate the force necessary to move the hood and fender assembly 42 relative to its position between the fully open and fully closed position. This adjustment is made by aligning alignment notches 336 on the hood pivot mounting bracket 314 and 337 on the J bracket 320 prior to the attachment of the hood pivot mounting bracket 314 to the frame 22 thereby providing the necessary preload to assist in operation of the hood and fender assembly 42.

In addition to the hex-shaped torsion spring assist 300, the hood and fender assembly mounting system incorporates one or more hood restraint cylinders 45 for preventing sudden opening of the hood and fender assembly 42 and controlling the rate of travel of the hood and fender assembly when it is moved between the closed and open position, FIG. 6. The hood restraint cylinders 45 are attached to the toweye brackets 313 by inserting a threaded stud 334 at the end of the hood restraint cylinder rod 333 through a washer 331 and then the toweye bracket 313 and securing with nut 330. The other end of the hood restraint cylinder 45 is attached in a similar manner to the hood and fender assembly 42 using the threaded stud 334, a washer 331 and nut 330. The hood restraint cylinder 45 may resist the motion of the hood restraint cylinder rod 333 in the extend or retract direction. The hood restraint cylinder rod 333 is in its fully extended position when the hood and fender assembly 42 is open (see FIG. 1, solid lines 63a) and fully retracted when the hood and fender assembly is closed (FIG. 1 dashed lines 63b). Movement in either direction of the hood and fender assembly 42 between the open and closed position may be resisted by the extension or retraction of the hood restraint cylinder rod 333 as it moves through the fluid in the hood restraint cylinder 45. The degree of resistance in either direction may be controlled by the internal valving of the hood restraint cylinder 45. In the exemplary embodiment of the present invention, the hood restraint cylinders 45 are gas filled and resist motion in the extend or opening direction of movement of the hood and fender assembly 42.

The present invention prevents or reduces problems associated with the use of elastic straps or spring loaded latches to connect the rearward portion of the hood and fender assembly to the cab. In such a configuration, the rearward portion of the hood and fender assembly moves relative to the frame when the cab moves on its shock absorbing mechanism or when the frame flexes independent of the cab while the frontward portion of the hood and fender assembly, which is mounted directly to the frame, does not. The flexing of the fiberglass hood and fender assembly causes warpage and paint damage to the hood and fender assembly, requiring a large gasket to cushion impacts between the hood and fender assembly and the cab. The present invention eliminates the mechanical connection between the hood and fender assembly and the cab, and the need for the large gasket, by coupling both the frontward and rearward portions of the hood and fender assembly directly to the frame of the vehicle thereby reducing flexure of the hood and fender assembly. The present invention also increases security and convenience by making the hood latches relatively inaccessible from outside the vehicle and allowing for disengagement of the latches from inside the cab. This remote actuation feature discourages unauthorized access to the hood when the vehicle is locked and allows the driver to unlatch the hood from the comfort of the cab. The present invention improves ride quality because the hood and fender assembly does not limit the motion of the cab on its shock absorber or cause additional motion of the cab.

The present invention controls both the rate of travel and force required to move the hood and fender assembly between the closed and open position. Hood restraint cylinders prevent sudden movement by limiting the rate of travel. The hex-shaped torsion spring assist allows the force required to open and close the hood and fender assembly to be set by preloading the torsion bars prior to their installation. The hex-shaped torsion bar eliminates the need for additional means of fixing the bar to the hood and fender assembly necessary when round cross section bars are used because the hex-shaped torsion bar slip fits into the J bracket socket and the hood pivot bracket and is thereby prevented from rotation relative to its mounting location.

From the above description of a preferred embodiment of the invention, those skilled in the art will perceive improvements, changes and modifications. Such improvements, changes and modifications within the skill of the art are intended to be covered by the appended claims.

What is claimed is:

1. A hood support and latching system for an over-the-highway vehicle, comprising:
   a) a vehicle frame structure comprising a spaced pair of frame members continuously extending longitudinally for substantially the entire length of the vehicle and including a cab mounting portion supporting an operator cab and a prime mover mounting portion forward of said cab portion;
   b) a hood assembly, movable between opened and closed positions and operative to enclose an engine compartment when in said closed position;
   c) at least one hood latch mechanism for maintaining closure of said hood assembly including first and second latch assemblies;
   d) a rigid locating structure coupled directly to said frame structure for locating said first latching assembly on said frame and said second latching assembly attached to a rear section of said hood assembly, said first and second latching assemblies engageable, when said hood assembly is moved to its closed position and operative to vertically and laterally fix the rear section of said hood assembly relative to said frame such that hood assembly movement in either direction along the vertical axis is controlled by said engaged first and second latch members and isolating said hood assembly from said cab mounting portion such that said hood assembly is substantially unsupported by said cab and movement of said hood assembly is not transmitted to said cab; and
   e) at least one pivot assembly mounted to a forward end of said frame structure for supporting a forward end of said hood assembly and defining a pivot axis for said hood assembly, whereby said hood assembly is entirely supported said frame structure.

2. The system of claim 1, further comprising a spring assist formed by at least one torsion bar having one end coupled to and rotatable with said hood assembly and having its other end held against rotation by structure coupling said other end to said frame structure.

3. The system of claim 1, further comprising a movement regulating mechanism comprising at least one damping cylinder having one end attached to said hood assembly and another end pivotally coupled to said frame structure.

4. The system of claim 1, comprising two hood latch mechanisms having second latching assemblies secured to a rear section of said hood assembly at spaced apart locations.

5. The system of claim 1, wherein said first and second latching assemblies comprise a receiver assembly and a pin assembly, respectively.

6. The system of claim 1, wherein said frame structure comprises a pair of elongate, parallel frame members.

7. The apparatus set forth in claim 1 wherein said locating structure comprises a strut.

8. The system of claim 2, wherein said torsion bar is hex-shaped in cross-section and said one end is received in a hex-shaped socket rotatable with said hinge assembly about said hinge assembly pivot axis and said other end is held against rotation by stationary hex-shaped structure.

9. The system of claim 4, wherein said first latching assemblies are rigidly secured to said frame structure by laterally extending struts which locate said first latching assemblies in alignment with associated second latching assemblies of said latch mechanisms.

10. The apparatus set forth in claim 8 wherein said torsion bar further includes an alignment structure.

11. An apparatus for supporting a hood and fender assembly of a heavy duty truck comprising:
- a frame comprising a spaced pair of parallel, longitudinal rails continuously extending longitudinally for substantially the entire length of the vehicle and supporting an engine, a cab, and said hood and fender assembly which operates to enclose said engine, said hood and fender assembly being pivotally mounted at its frontward end to said frame by two hinge assemblies, each assembly including a non-rotating anchor portion and a rotatable hinge portion, located at either said of said hood and fender assembly;
- a torsion spring assist which controls the effort needed to operate said hood and fender assembly comprising two torsion bars having a hexagonal socket which forms part of one of the rotatable hinge portions and which rotates with said hood and fender assembly and the other end of each said torsion bar being inserted into a hexagonal shaped opening defined by a non-rotating anchor portion of the other hinge assembly;
- at least one fluid filled damper device connected between said hood and fender assembly and said frame which controls the rate of travel of said hood and fender assembly;
- two latch mechanisms located at spaced apart locations at the rearward portion of said hood and fender assembly each comprising a receiver assembly mounted to one of said frame rails, independent of said cab, on a receiver support strut whereby said receiver support strut rigidly couples said receiver assembly to said frame and a pin assembly mounted to said hood and fender assembly at a location allowing said pin assembly to be received by said receiver assembly thereby controlling movement of the hood and fender assembly in both directions along a vertical axis;
- said receiver assembly further including a lock lever which engages said pin assembly and releasably retains said pin assembly to connect said pin assembly to said receiver assembly thereby maintaining said hood and fender assembly in a predetermined, fixed position relative to said frame such that said hood and fender assembly is isolated from said cab; and
- operating means for moving said lock lever to a released position whereby said receiver assembly releases said pin assembly.

12. A truck assembly, comprising:
- a) a pair of spaced longitudinal frame members continuously extending longitudinally for substantially the entire length of the vehicle;
- b) a cab mounted directly to said frame members by cab mounting structure that allows said cab to move relative to said frame members in response to forces applied to said cab during truck assembly use;
- c) a hood assembly for at least partially enclosing an engine compartment forming part of said truck assembly and movable between opened and closed positions, said hood assembly located immediately adjacent said cab when in its closed position;
- d) mounting structure for mounting a forward end of said hood assembly to at least one of said frame members, said mounting structure defining a lateral pivot axis for said hood assembly about which said hood assembly rotates between said opened and said closed positions; and,
- e) a latch mechanism including first and second latch assemblies, one of said latch assemblies attached to a rear portion of said hood assembly, the second of said latch assemblies attached to one of said frame members, such that upon movement of said hood assembly to its closed position, said first and second latch assemblies engage to maintain said hood assembly in said closed position thereby controlling movement of the hood assembly in both directions along a vertical axis and to connect said rear portion of said hood assembly directly to at least one of said frame members, such that said hood assembly is substantially free of connections between itself and said cab, and whereby movement in said cab relative to said frame members is not substantially restricted by said hood assembly when said hood assembly is in its closed position.

13. The truck assembly of claim 12 wherein said second latch assembly includes a support strut that is secured to said one frame member.

14. A truck assembly, comprising:
- a) a pair of spaced longitudinal frame members continuously extending longitudinally for substantially the entire length of the vehicle;
- b) a cab mounted directly to said frame members by cab mounting structure that allows said cab to move relative to said frame members in response to forces applied to said cab during truck assembly use;
- c) a hood assembly for at least partially enclosing an engine compartment forming part of said truck assembly and movable between opened and closed positions, said hood assembly located immediately adjacent said cab when in its closed position;
- d) front mounting structure for mounting a forward end of said hood assembly to at least one of said frame members, said mounting structure defining a lateral pivot axis for said hood assembly about which said hood assembly rotates between said opened and said closed positions; and,
- e) rear mounting structure for connecting and supporting a rear portion of said hood assembly to at least one of said frame members thereby controlling movement of the hood assembly in both directions along a vertical axis, such that said hood assembly is substantially free of connections between itself and said cab, and whereby movement in said cab relative to said frame members is not substantially restricted by said hood assembly when said hood assembly is in its closed position.

15. The truck assembly of claim 14 wherein said rear mounting structure comprises a latch mechanism including first and second latch assemblies, one of said latch assemblies being attached to said rear portion of said hood assembly, the second of said latch assemblies being attached to one of said frame members, such that upon movement of said hood assembly to its closed position, said first and second latch assemblies engage to maintain said hood assembly in said closed position and to connect said rear portion of said hood assembly directly to at least one of said frame members.

16. A truck assembly, comprising:
- a) a pair of spaced longitudinal frame members continuously extending longitudinally for substantially the entire length of the vehicle;
- b) a cab mounted directly to said frame members by cab mounting structure that allows said cab to move relative to said frame members in response to forces applied to said cab during truck assembly use;

c) a hood assembly for at least partially enclosing an engine compartment forming part of said truck assembly and movable between opened and closed positions, said hood assembly located immediately adjacent said cab when in its closed position;

d) mounting structure for mounting a forward end of said hood assembly to at least one of said frame members, said mounting structure defining a lateral pivot axis for said hood assembly about which said hood assembly rotates between said opened and said closed positions;

e) a support strut attached to at least one of said frame members; and, f) a latch mechanism including first and second latch assemblies, one of said latch assemblies attached to a rear portion of said hood assembly, the second of said latch assemblies attached to said support strut, such that upon movement of said hood assembly to its closed position, said first and second latch assemblies engage to maintain said hood assembly in said closed position thereby controlling movement of the hood assembly in both directions along a vertical axis and to connect said rear portion of said hood assembly directly to at least one of said frame members, such that movement in said cab relative to said frame members is not substantially restricted by said hood assembly when said hood assembly is in its closed position.

17. The truck assembly of claim 16 further comprising:

a) a second support strut attached to said other frame member; and, b) a second latch mechanism having a first latch assembly attached to said rear portion of said hood assembly and a second latch assembly attached to said second strut.

18. The truck assembly of claim 16 wherein said support strut extends upwardly from said frame member to which it is attached.

* * * * *

UNITED STATES PATENT AND TRADEMARK OFFICE
CERTIFICATE OF CORRECTION

PATENT NO. : 6,637,531 B2
DATED : October 28, 2003
INVENTOR(S) : Palenchar et al.

It is certified that error appears in the above-identified patent and that said Letters Patent is hereby corrected as shown below:

<u>Column 12,</u>
Line 36, add the word -- by -- immediately after "supported";

<u>Column 13,</u>
Line 11, change the first occurrence of "said" to -- side --;
Line 26, change "the" to -- a --.

Signed and Sealed this

Twentieth Day of January, 2004

JON W. DUDAS
*Acting Director of the United States Patent and Trademark Office*